Figure 1:
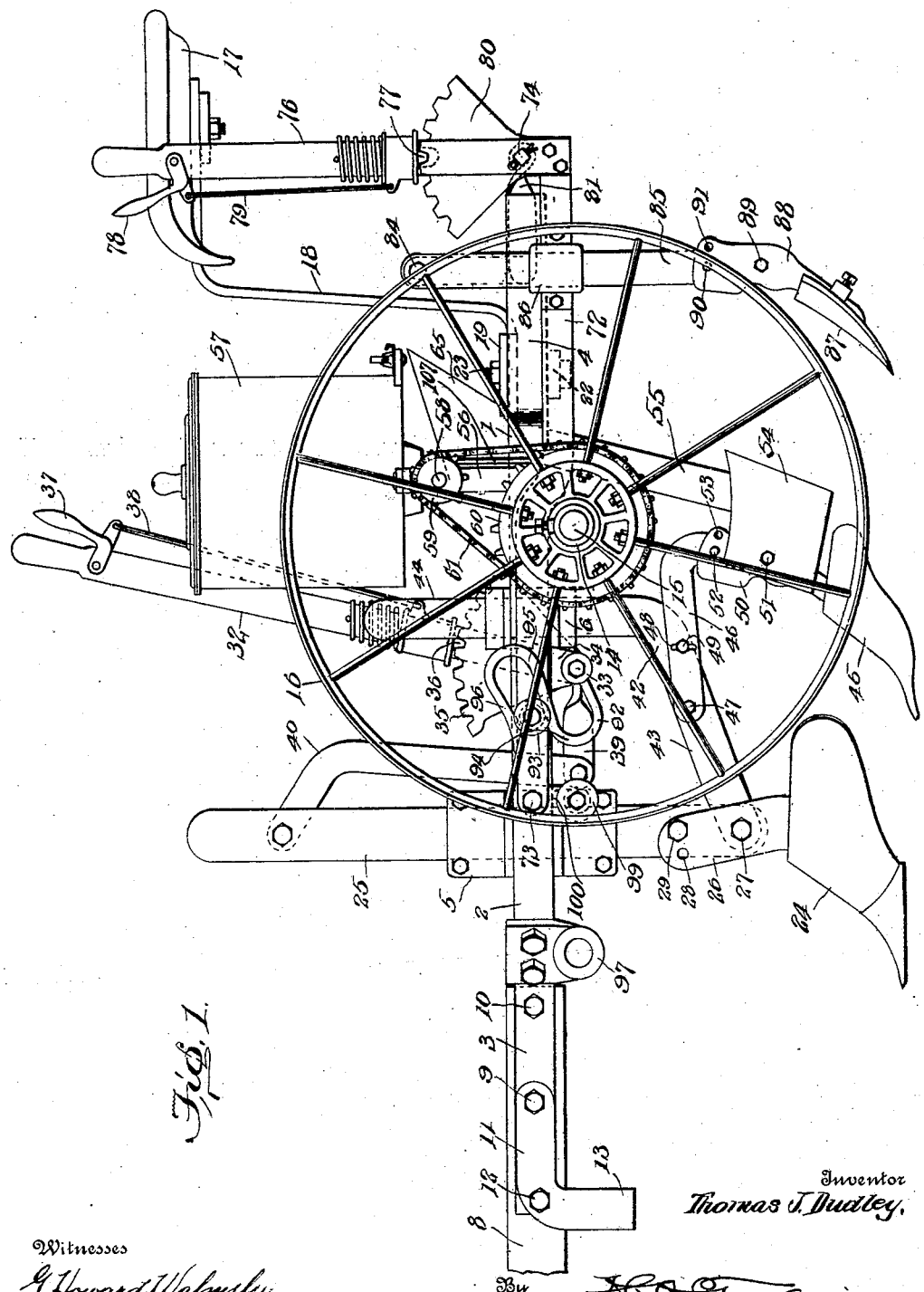

No. 852,499. PATENTED MAY 7, 1907.
T. J. DUDLEY.
PLANTER.
APPLICATION FILED OCT. 4, 1905. RENEWED MAR. 11, 1907.

7 SHEETS—SHEET 1.

Witnesses
G. Howard Walmsley
Ione Miller

Inventor
Thomas J. Dudley,
By
Attorney

No. 852,499. PATENTED MAY 7, 1907.
T. J. DUDLEY.
PLANTER.
APPLICATION FILED OCT. 4, 1905. RENEWED MAR. 11, 1907.

7 SHEETS—SHEET 2.

Witnesses
G. Howard Walmsley.
Irvine Miller.

Inventor
Thomas J. Dudley,
By
Attorney

No. 852,499. PATENTED MAY 7, 1907.
T. J. DUDLEY.
PLANTER.
APPLICATION FILED OCT. 4, 1905. RENEWED MAR. 11, 1907.

7 SHEETS—SHEET 3.

Fig. 3.

Witnesses
G. Howard Walmsley,
Ivonie Miller.

Inventor
Thomas J. Dudley,
By H. A. Toulmin.
Attorney

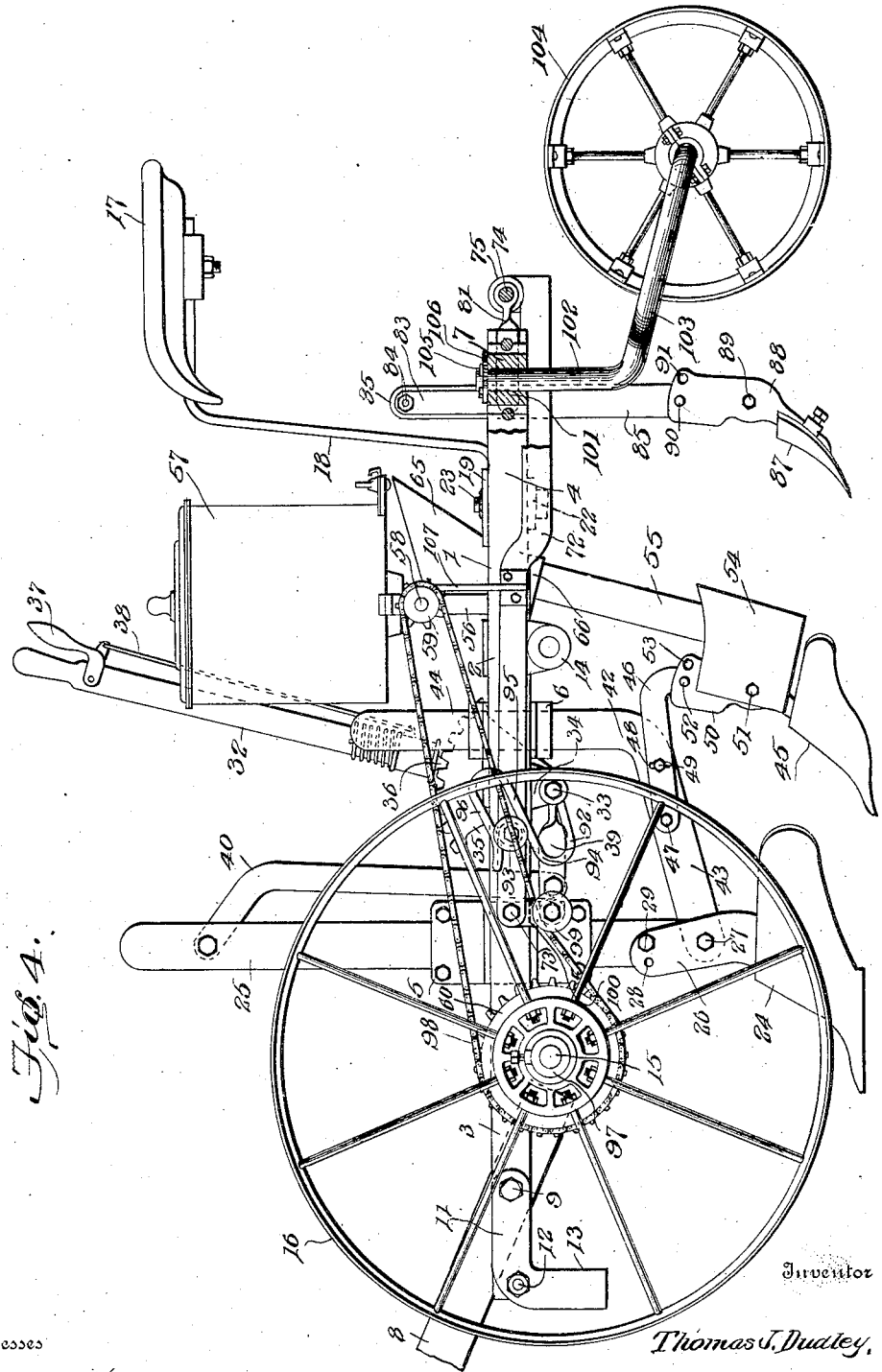

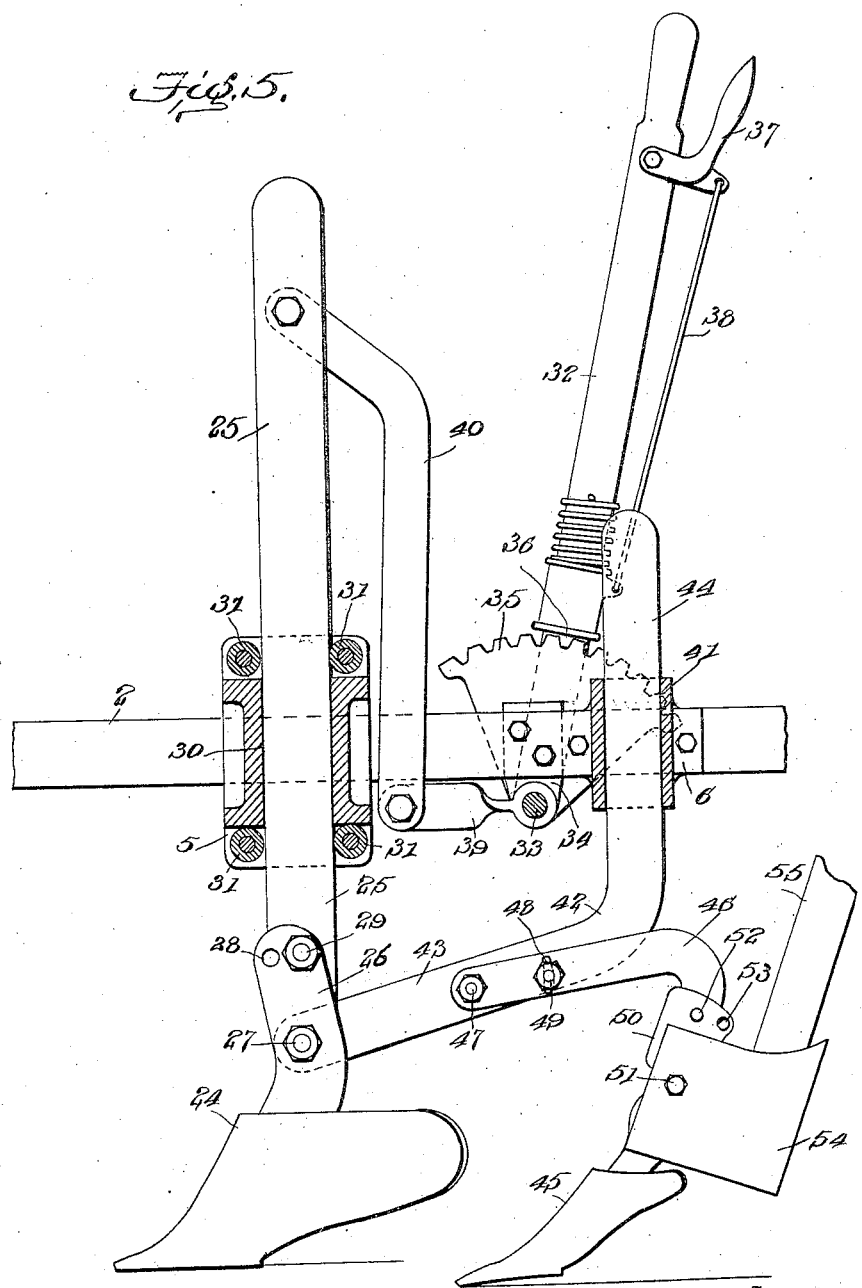

No. 852,499. PATENTED MAY 7, 1907.
T. J. DUDLEY.
PLANTER.
APPLICATION FILED OCT. 4, 1905. RENEWED MAR. 11, 1907.
7 SHEETS—SHEET 6.
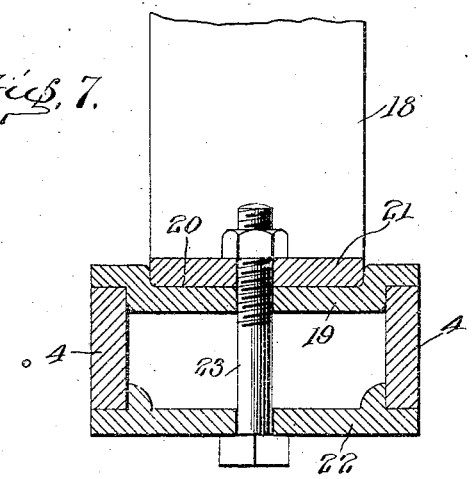
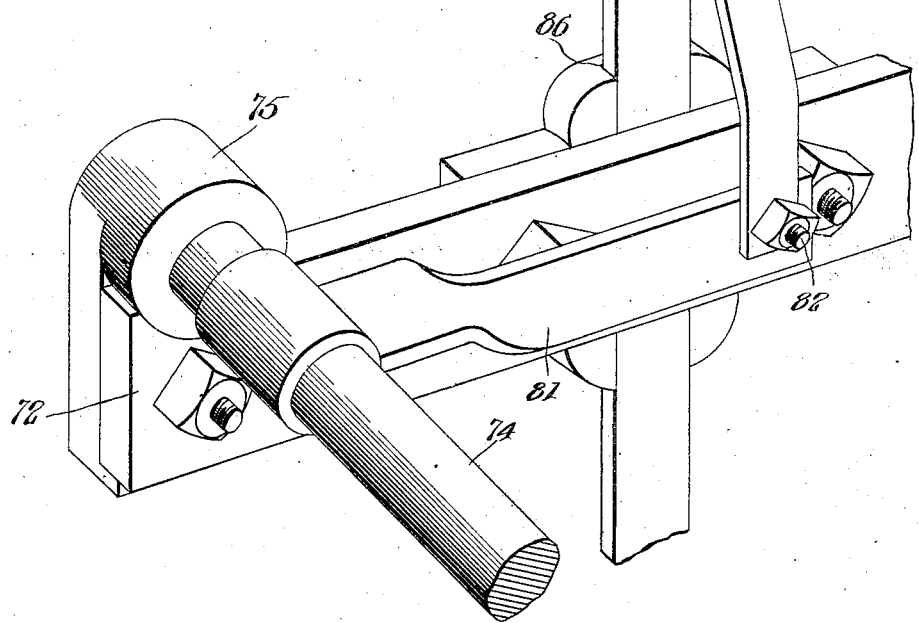
Witnesses
G. Howard Walmsley
Irvine Miller
Inventor
Thomas J. Dudley,
By H. A. Toulmin
Attorney
THE NORRIS PETERS CO., WASHINGTON, D. C.

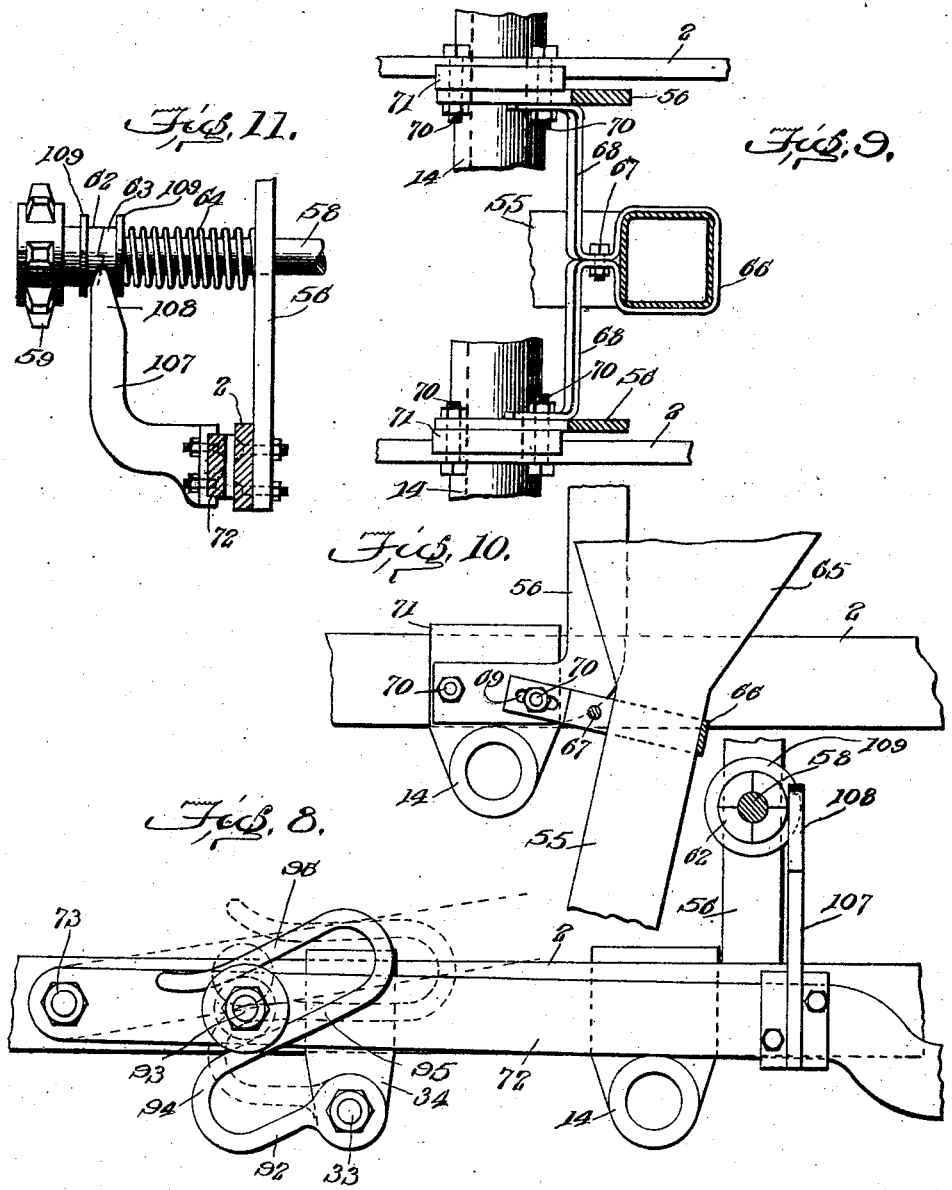

UNITED STATES PATENT OFFICE.

THOMAS J. DUDLEY, OF ABILENE, TEXAS, ASSIGNOR TO ED. S. HUGHES, OF ABILENE, TEXAS, AND H. C. STAHL, OF BELLEVUE, OHIO.

PLANTER.

No. 852,499. Specification of Letters Patent. Patented May 7, 1907.

Application filed October 4, 1905. Renewed March 11, 1907. Serial No. 361,832.

*To all whom it may concern:*

Be it known that I, THOMAS J. DUDLEY, a citizen of the United States, residing at Abilene, in the county of Taylor and State of Texas, have invented certain new and useful Improvements in Planters, of which the following is a specification, reference being had therein to the accompanying drawings.

This invention relates to planters, and more particularly to that class known as one-row planters, being specially designed for the planting of corn or cotton.

The type of machine to which my invention relates is one which, although capable of other uses, is primarily designed for the planting of corn or cotton in virgin soil, the machine being adapted to form the furrow, deposit the seed and properly cover the same without any preliminary preparation of the soil or breaking of the sod.

It is the object of my invention to provide a planter adapted for this kind of work, organized with sufficient strength to stand the strain of the large number of draft-animals which are sometimes required to operate such a planter under certain conditions, while, at the same time, the furrow opening and covering devices may be readily raised and lowered, both simultaneously and independently, as conditions may require.

A further object of my invention is to provide a planter of this class, having a driver's seat, which may be used either with a rigid tongue, the weight being supported upon the two ground-wheels, or with a pivoted tongue, the weight being supported upon the two ground-wheels and a press-wheel, the machine being readily convertible from one form to the other, and provision being made for the proper distribution of the weight.

To these and other ends my invention consists in certain novel features which I will now proceed to describe and will then particularly point out in the claims.

Figure 2:
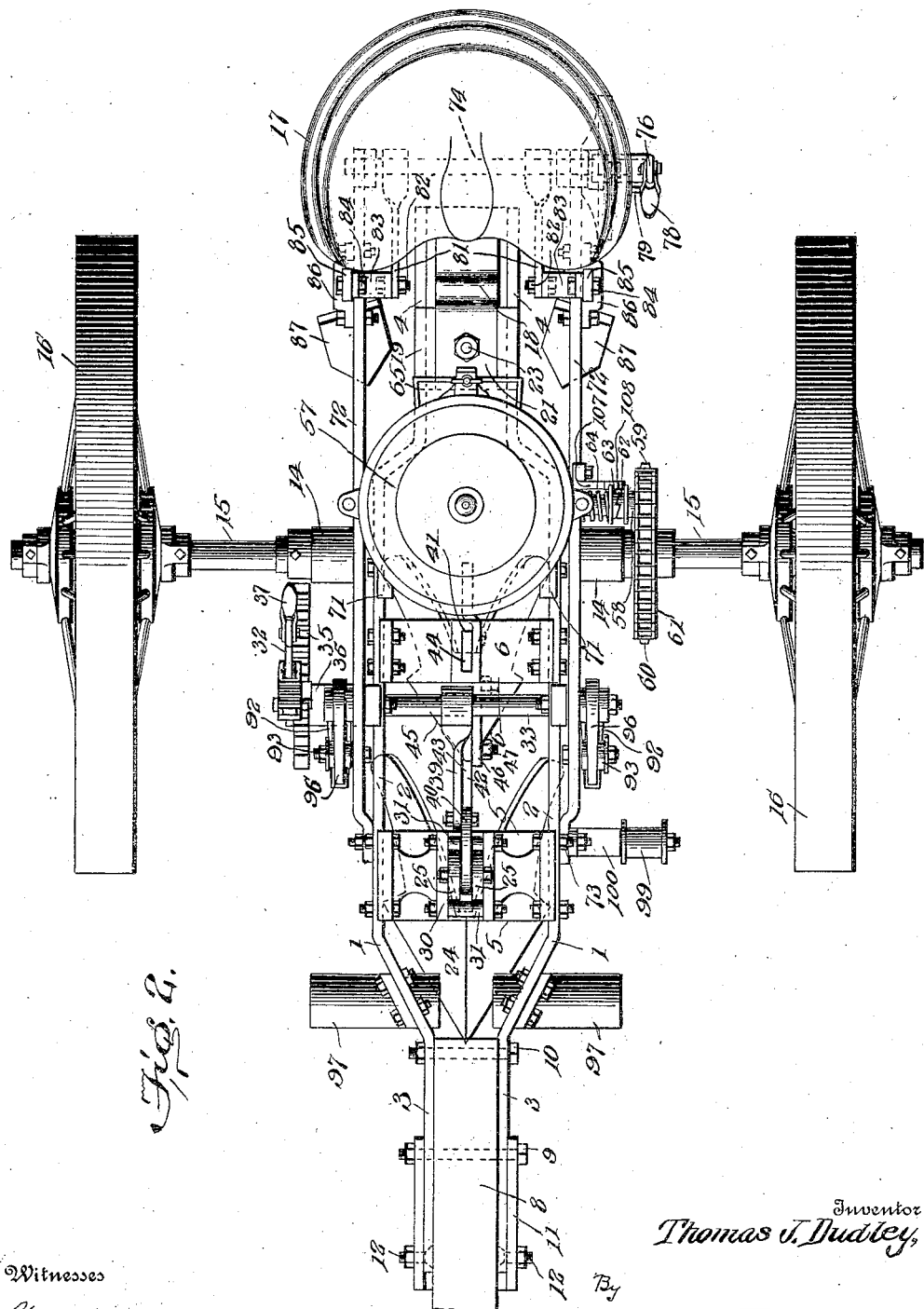

In the accompanying drawings, Figure 1 is a side elevation of a machine embodying my invention in one form, the same being shown arranged for use in connection with a rigid tongue and without a press-wheel; Fig. 2 is a plan view of the machine arranged as shown in Fig. 1; Fig. 3 is a rear elevation of the same; Fig. 4 is a side elevation of the machine, arranged for use with a pivoted tongue and press-wheel; Fig. 5 is a detail vertical sectional view on an enlarged scale, taken longitudinally and centrally of the forward part of the machine, illustrating the mode of raising, lowering, and bracing the furrow-opening devices; Fig. 6 is a detail perspective view, illustrating the mechanism for independently raising and lowering the covering devices; Fig. 7 is a detail view, in transverse vertical section, illustrating the connection between the seat-bar and main frame; Fig. 8 is a detail side elevation, illustrating the connection between the main frame and the supplemental frame which supports the covering devices; Fig. 9 is a detail plan section, illustrating the seed-tube support; Fig. 10 is a vertical section of what is shown in Fig. 9; and Fig. 11 is a detail sectional view illustrating the mechanism for automatically throwing out of gear the seed-dropping mechanism when the furrow-opening and covering devices are raised.

In the said drawings, I have shown a machine embodying my invention in one form, in which the main frame of the machine, indicated as a whole by the reference numeral 1, is composed of two longitudinally-extending bars 2, mainly parallel, and brought closer together at their front and rear ends, as indicated at 3 and 4 respectively. These bars are united and spaced apart as to their wider central portion by transverse members 5 and 6, to be hereinafter more specifically referred to. At the narrower rear end of the frame the bars 2 are united and spaced apart by a casting 7, to which also future reference will be made. Between the forward ends 3 of said bars, where they are brought more closely together, the rear end of the tongue 8 is located, the same fitting between said bars and being secured thereto by bolts 9 and 10. When thus secured, the tongue is rigidly connected to the frame, as shown in Figs. 1 and 2.

11 indicates a hitch, secured to the forward ends 3 of the bars 2 by means of bolt 9, and also by means of short bolts 12, which do not pass through the tongue. The hitch is provided with a downwardly extending loop 13, to receive the draft connections.

To each of the bars 2 there is secured, about midway of its length, a bearing-sleeve 14, in which bearing-sleeves the axle 15 is mounted to rotate, said axle being supported by the ground-wheels 16.

17 indicates the driver's seat, supported on a seat-bar 18, which is secured to the main frame at the rear end thereof so as to be adjustable longitudinally thereon. For this purpose I prefer to employ the construction shown in detail in Fig. 7 of the drawings. In this construction 19 indicates a clamping-plate which rests upon and extends down between the end portions 4 of the bars 2 where they are brought close together at the rear of the machine. This clamping-plate is provided with a seat 20, in which fits the lower horizontal end-portion 21, of the seat-bar 18.

22 indicates a second clamping-plate, located below the frame-bars, and 23 indicates a clamping-bolt which passes through both clamping-plates and the seat-bar, serving to secure the same in position on the frame-bars at any place to which they may be adjusted. By reason of this construction, the seat may be so adjusted as to cause the weight of the driver to counterbalance the weight of that portion of the machine lying in front of the axle, such counterbalancing being desirable when the tongue is rigidly connected with the frame, in order to relieve the weight of the load at the horses' necks.

The furrow-opening devices comprise a main plow 24, located at the front of the machine. This plow is preferably a double moldboard plow of the type known as a middle burster or middle breaker. This plow is secured to the lower end of a vertical stock 25, the connection being preferably an adjustable one, as shown. In this construction, the plow shank 26 is pivotally connected with the lower end of the stock by means of a bolt 27, and the upper end of the shank is provided with a plurality of apertures 28, through any one of which may be passed a securing-bolt 29, which also passes through the stock. This connection permits the plow 24 to be adjusted to different angles longitudinally of the machine, or, in other words, to be tilted more or less. The stock 25 extends upward through a suitable guide 30, formed in the transverse member 5 of the frame, said guide being preferably provided with anti-friction rollers 31, in order to facilitate the vertical movement of the stock under the severe strains to which it is subjected in use. This vertical movement of the stock 25 is controlled by a hand-lever 32, secured on a rock-shaft 33, mounted in bearings 34, secured to the frame-bars 2, 35 indicating a locking-quadrant secured to one of the frame-bars and coöperating with a spring-controlled locking-bolt 36, mounted on the hand-lever 32 and operated by means of the hand-piece 37 and link 38. The rock-shaft 33 has secured to its central portion an arm 39, which arm is connected to the upper end of the plow-stock 25 by a link 40, so that the motion imparted by the lever 32 to the rock-shaft 33 will move the stock and plow vertically to any desired position, in which position it may be locked by the locking mechanism described.

Plows of this description are frequently subjected to very great strain, particularly in the breaking of new ground, since it is frequently necessary to hitch four or more horses to a single furrow-opener of this type in order to draw the same through the ground. Since the plow must be readily movable in a vertical direction, to permit it to be raised clear of the ground for transportation when not at work and in turning at the ends of furrows, while it must be also readily adjustable when at work, to permit it to conform to irregularities of the surface of the soil, no rigid system of bracing can be employed to enable it to resist the strains to which it is subjected. I have therefore devised a construction whereby the lower end of the stock, where the strain is most severe, is effectually braced in all of its positions without interfering with the adjustment thereof. To this end I provide in the transverse member 6 a guide 41, and employ a brace 42, secured at its forward end to the lower end of the stock 25, its rear portion being vertical and fitted so as to slide in the guide 41. The forwardly extending portion of the brace is indicated at 43 and the vertical portion at 44. This latter portion is parallel with the stock 25, and moves in unison therewith through the guide 41, while the forwardly-extending portion 43 firmly braces the lower end of the stock against rearward motion.

The main plow 24, which opens the main furrow, is followed by a second plow 45, arranged in the rear thereof and in alinement therewith, said second plow opening a sub-furrow in which the seed is actually deposited. In order to cause these two plows to move vertically in unison, I connect the plow 45 to a beam 46, which is in turn connected to the brace 42. This connection is preferably an adjustable one, as shown, and to this end the beam 46 is pivoted at its forward end to the brace 42 by means of a bolt 47. At a point rearward of its forward end the beam 46 is provided with a vertical slot 48, and a clamping-bolt 49 passes through this slot and through the brace 42, so that the angle of the beam 46 may be adjusted relatively to the brace for the purpose of raising and lowering the plow 45, relatively to the plow 24. The shank 50 of the plow 45, is connected to its beam by means of a pivot-bolt 51 and break-pin 52, and is provided with a plurality of apertures 53, for the break-pin, so that the angle of tilt of the plow relatively to the beam may be adjusted, and the plow will be free to swing back without damage when an obstruction is met. There is also provided the usual guard or boot 54, to receive the lower end of the seed-tube 55, through which the seed is delivered to the furrow formed by the plow 45.

The seed-dropping mechanism may be of any suitable description, and is supported upon the main frame. To this end, standards 56 extend upward from said main frame and support the seed-hopper 57 and the dropping mechanism associated therewith. This latter comprises a shaft 58, mounted in the standards 56, and having loosely mounted thereon at one end a sprocket-wheel 59, which is driven from a sprocket-wheel 60, secured on the main axle, through the medium of a sprocket-chain 61. The sprocket-wheel 59 carries a ratchet-clutch member 62, with which coöperates a similar ratchet-clutch member 63, splined on the shaft 58 so as to rotate in unison therewith while free to move longitudinally thereon. The sprocket-wheel 59 and its clutch member 62 are free to rotate on the shaft 58, but are prevented from moving longitudinally thereon. A spring 64 is coiled on the shaft 58 between the standard 56 and clutch member 63, and serves to hold said clutch member in engagement with the clutch member 62. By this construction, rotary motion will be transmitted from the axle to the shaft 58 when the machine is moving forward, while reverse motion of the axle will not be transmitted to the shaft 58, the ratchet-clutch members slipping by each other in this latter case.

The seed-tube 55 is provided at its upper end with a funnel-like enlargement 65 to receive the seed as it falls from the dropping-mechanism, and the upper end of said tube is adjustably supported by means of a yoke 66, which fits around said tube and is clamped to grip the same by means of a bolt 67. The ends of this yoke are formed into diverging arms 68, the extremities of which are slotted, as indicated at 69, for the passage of clamping bolts 70. This construction permits the ready adjustment of the position of the seed-tube. The bolts 70 also serve to secure the standards 56 to the frame-bars 2, as well as the brackets 71 which support the bearing sleeves 14.

The covering devices are carried by a supplemental frame which is free to swing vertically relatively to the frame. This supplemental frame comprises two longitudinally-extending bars 72, lying outside of the frame-bars 2, to which latter they are pivotally connected at their forward ends, as indicated at 73. The supplemental frame-bars 72 are connected at their rear ends by means of a rock-shaft 74, mounted in bearings 75, secured to the rear ends of said bars. To one end of the rock-shaft 74 there is secured a hand-lever 76, having a spring-actuated locking-bolt 77, controlled by a hand-piece 78 and link 79, said locking-bolt being arranged to engage a locking-quadrant 80, mounted on the rear end of the supplemental frame. The rock-shaft 74 has secured thereon near each end a forwardly-extending arm 81, and to the free end of each arm 81 there is pivoted, as indicated at 82, the lower end of a link 83, which link 83 extends upward and is pivoted at its upper end, as indicated at 84, to the upper end of a vertical stock 85, which carries at its lower end a covering device. Two of these covering devices are employed, one on each side of the furrow, as shown, and each bar 72 of the supplemental frame is provided with a guide 86, in which the corresponding stock 85 is free to move vertically. The covering-devices may be of any suitable description, and I have shown for this purpose covering-shovels 87, the shanks 88 of which are pivoted at 89 to the lower ends of the stocks 85, to which they are adjustably connected above the said pivot by break-pins 90 and adjusting apertures 91, as is usual in structures of this class. It will be seen that the covering devices may be adjusted vertically relatively to the supplemental frame in which they are mounted by means of the hand-lever 76, and may be locked in the position to which they are so adjusted.

To cause the supplemental frame and its covering-devices to be raised and lowered along with the furrow-opening devices when these latter are raised clear of the ground, or lowered into working position, I have provided the structure shown more particularly in detail of Fig. 8 of the drawings. In that construction, the rock-shaft 33 is provided at each of its ends with a cam-arm 92, lying outside of the corresponding supplemental frame-bar 72, which latter is provided with a projection, preferably in the form of a roller 93, coöperating with said cam-arm.

It will be seen that each cam-arm is approximately in the form of the letter S, and has a shoulder 94, and two parallel portions 95 and 96, so arranged that the space between them is substantially concentric with the rock-shaft 33. It results from this construction that when the parts are in the position shown in full lines in Fig. 8, any rotation of the rock-shaft 33 for the purpose of lowering the furrow-openers, or for adjusting them to any position throughout that portion of their range of movement which lies below the point which they occupy when the parts are in position shown in full lines in Fig. 8, will have no effect in raising and lowering the supplemental frame relative to the main frame. This range of motion of the furrow-openers is sufficient to provide for all of the adjustments which they may require while at work to accommodate them to the inequalities of the surface of the soil upon which they are operating, so that these adjustments of the furrow-openers, which may be termed the working adjustments, can be made without in any way effecting the position of the covering devices. Furthermore, since the projections or rollers 93 are held between the parallel arms 95 and 96 of the cam-arms 92, said projections are prevented from moving vertically relatively to the main frame, and the supplemental frame is therefore locked relatively to the main frame. It follows from this that the adjustments of the covering-devices relatively to the supplemental frame by the hand-lever 76 and its associated mechanism, which adjustments are the working adjustments of said covering-devices, are rendered effectual by reason of the locking of the supplemental frame to the main frame so that said supplemental frame can not yield upward when the covering-devices are depressed, and said covering devices are therefore moved downward to the desired position and firmly held there. When, however, at the end of a furrow or at the end of the day's work, it is desired to raise both the furrow-opening and the covering devices entirely clear of the ground, then the range of movement of the hand-lever 32 is not only sufficient to lift the furrow-openers to the desired height, but also sufficient to cause the shoulders 94 of the cam-arms 92 to engage and lift the projections or rollers 93, as indicated in dotted lines of Fig. 8. This also lifts the supplemental frame-bars 72 relatively to the main frame, as also indicated in dotted lines in Fig. 8, thereby lifting the rear end of the supplemental frame and raising the covering devices clear of the ground along with the furrow-opening devices. Movement of the hand-lever 32 in the opposite direction will again bring the parts into working position, lowering both the furrow-openers and covering-devices to the ground and locking the supplemental frame with relation to the main frame. When the parts are thus lowered into working position, the furrow-opening devices and the covering devices are independently adjusted to meet working conditions through the medium of their respective hand-levers 32 and 76.

It will be noted that the main frame of the machine is supported at a fixed distance above the ground, and is a continuous or substantially rigid frame, the ground-working devices being supported from said frame and their adjustment relatively to the soil being effected by their movements relatively to said frame, which latter does not require to be moved in any way to effect the movements of the ground-working devices toward and from the soil. Thus the raising and lowering of the heavy frame is done away with, and the driver is supported at a fixed elevation, while the seeding mechanism remains in fixed relation to the axle from which it is driven.

Under certain conditions, it is desirable to employ a press-wheel for the purpose of completing or rendering more effectual the covering of the seed, and at the same time pressing down or rendering more compact the soil above the same. When the machine is to be used in this way, the axle is shifted to the forward portion of the machine, and, to permit this, the main frame is provided near its forward end, just back of the tongue, with supplemental bearing-sleeves 97. The axle may be readily slipped out of the bearing-sleeves 14 by removing one of the ground-wheels 16, and is then slipped through the bearing-sleeves 97 and the ground-wheel again secured thereon. This arrangement is shown in Fig. 4. To meet the increased distance between the axle and dropper-shaft 58, a longer sprocket-chain 98 is substituted for the sprocket-chain 61, and any slack in the chain may be taken up by means of a tightening roller or idler 99, carried by an arm 100, pivotally connected to the main frame by one of the pivot-bolts 73 of the supplemental frame-bars 72. The casting 7 at the rear end of the main frame is provided with an aperture 101, formed vertically therethrough, constituting the bearing for the vertical pivot-shank 102 of an arm 103, on which is journaled a press-wheel 104 of any suitable description. This latter is secured in position by means of a pin 105 and washer 106 on the upper end of the shank of the arm 103. The connection of the tongue is rendered pivotal by withdrawing the bolt 10 and leaving the bolt 9 as the sole connection between the main frame and tongue, so that the tongue may swing freely in a vertical plane around the pivot thus formed. With the machine arranged in the manner shown in Fig. 4, it will be seen that the weight of the frame and driver is brought very largely upon the press-wheel, so that this latter will firmly press the soil on top of the furrow. It will be understood, of course, that the swiveling connection and trailing arrangement of the press-wheel permit it to follow the furrow and render it self-adjusting.

In order to stop the delivery of seed when the furrow opening and covering devices are lifted into non-working position, I provide upon one of the bars 72 of the supplemental frame an arm 107, the upper end of which is formed into a wedge or cam 108, as shown more particularly in the detail view, Fig. 11. The clutch members 62 and 63 are provided with annular flanges or collars 109, which lie in the path of the cam 108, so that when the frame bars 72 are swung upward into non-working position, the cam 108 will enter between the collars 109, and will force the latter apart by pressing the clutch member 63 inward away from the clutch member 62, thereby separating the clutch members and stopping the rotation of the shaft 58. When the supplemental frame is again lowered to working position, the cam 108 is withdrawn so as to permit the clutch member 63 to engage again with the clutch member 62, thereby re-establishing the operative connection between the shaft 58 and its source of power.

I do not wish to be understood as limiting myself to the precise details of construction hereinbefore described and shown in the accompanying drawings, as it is obvious that these details may be modified without departing from the principle of my invention.

Having thus fully described my invention, what I claim as new and desire to secure by Letters Patent is:

1. In a planter, a frame provided with a guide, a plow having a stock mounted to slide in said guide, and means for vertically adjusting said plow and stock, in combination with a second guide mounted on the frame, and a brace having a portion fitted to slide in said second guide, said brace being connected to the lower portion of the stock, substantially as described.

2. In a planter, a frame provided with two parallel guides, a plow having a stock mounted to slide in one of said guides, means for vertically adjusting said plow and stock, and a brace having a portion parallel with the stock and fitted to slide in the other guide, and a portion extending to and connected with the lower end of the stock, substantially as described.

3. In a planter, a frame provided with a guide, a plow having a stock mounted to slide in said guide, and means for vertically adjusting said plow and stock, in combination with a second guide mounted on the frame in the rear of the stock-guide and in alinement therewith, and a brace having a portion fitted to slide in said rear guide, said brace being connected to the lower portion of the stock, substantially as described.

4. In a planter, a frame provided with two parallel guides arranged in longitudinal alinement thereon, a plow having a stock mounted to slide in the forward guide, means for vertically adjusting said plow and stock, and a brace having a portion fitted to slide in the rear guide and a portion extending forward and connected to the lower end of the stock, substantially as described.

5. In a planter, a frame provided with two guides longitudinally alined thereon, a front plow having a stock mounted to slide in the forward guide, a brace mounted to slide in the rear guide and connected to the lower portion of the stock, means for raising and lowering said front plow, stock and brace, and a seed-furrow plow alined behind the front plow and connected to and moving with said brace, substantially as described.

6. In a planter, a frame provided with two guides longitudinally alined thereon, a front plow having a stock mounted to slide in the forward guide, a brace mounted to slide in the rear guide and connected to the lower portion of the stock, means for raising and lowering said front plow, stock and brace, and a seed-furrow plow alined behind the front plow and provided with a beam connected to the brace and vertically adjustable relative thereto, substantially as described.

7. In a planter, a frame provided with two vertical guides longitudinally alined thereon, a stock mounted to slide in the forward guide, an angular brace having a vertical portion mounted to slide in the rear guide and a forwardly extending portion secured to the lower end of the stock, a rock-shaft mounted in the frame and provided with an arm, a link connecting said arm with the upper portion of the stock, a hand-lever mounted on said rock-shaft and provided with locking means, and a plow mounted on the lower end of the stock, substantially as described.

8. In a planter, a frame provided with two vertical guides longitudinally alined thereon, a stock mounted to slide in the forward guide, an angular brace having a vertical portion mounted to slide in the rear guide and a forwardly extending portion secured to the lower end of the stock, a rock-shaft mounted in the frame and provided with an arm, a link connecting said arm with the upper portion of the stock, a hand-lever mounted on said rock-shaft and provided with locking means, and a plow mounted on the lower end of the stock, said plow being adjustable to different angles of tilt, substantially as described.

9. In a planter, a wheel-supported main frame provided with furrow-opening devices, and means for raising and lowering and adjusting the working position of said furrow-opening devices, in combination with a supplemental frame, covering-devices carried by said supplemental frame, and means for independently raising and lowering said covering-devices relatively to said supplemental frame, the means for raising and lowering the furrow-opening devices serving also to raise and lower the supplemental frame from and to working position, and means for automatically locking the supplemental frame relatively to the main frame when lowered to working position, substantially as described.

10. In a planter, a wheel-supported main frame provided with furrow-opening devices, and a supplemental frame provided with covering-devices and means for raising and lowering said covering-devices relatively to said supplemental frame, in combination with means for simultaneously raising and lowering the furrow-opening devices and supplemental frame relatively to the main frame, said means acting to lock the supplemental frame relatively to the main frame when lowered to working position, said means also serving to vertically adjust the furrow-opening devices when in working position while maintaining the supplemental frame in locked relation to the main frame, substantially as described.

11. In a planter, a wheel-supported main frame provided with furrow-opening devices, rock-shaft connected with said furrow-opening devices to move same vertically, means for operating said rock-shaft, a supplemental frame pivotally connected to the main frame and provided with covering-devices and means for adjusting the same vertically relatively to said supplemental frame, said rock-shaft being provided with cam-arms engaging the supplemental frame and acting to raise and lower the same during a portion of the rock-shaft's movement, and to hold the same stationary relatively to the main frame during the remainder of the rock-shaft's movement, substantially as described.

12. In a planter, a wheel-supported main frame provided with furrow-opening devices, a supplemental frame pivoted to the main frame and provided with covering devices and means for vertically adjusting the same relatively to said supplemental frame, a rock-shaft mounted on the main frame, provided with an operating lever, and operatively connected with the furrow-opening devices to raise, lower and adjust the same, cam-arms secured to said rock-shaft and each comprising a shoulder and two concentric portions adjacent thereto, and projections on the supplemental frame arranged in the path of said shoulders and adapted to engage between said concentric portions, substantially as described.

13. In a planter, a wheel-supported main frame provided with furrow-opening devices and means for raising and lowering the same, a supplemental frame pivoted to the main frame and provided with covering-devices, means for raising and lowering said covering-devices relatively to the supplemental frame, and means for holding said supplemental frame stationary with respect to the main frame when lowered into working position, substantially as described.

14. In a planter, a wheel-supported main frame provided with vertically adjustable furrow-opening devices at its forward end, a rock-shaft connected to said furrow-opening devices to raise and lower the same and provided with an operating lever and with cam-arms, a supplemental frame pivoted at its forward end to the main frame, engaging the cam-arms, and provided at its rear end with vertically adjustable covering-devices, and a rock-shaft mounted on said supplemental frame, connected with the covering-devices to raise and lower the same, and provided with an operating lever, said cam-arms acting to raise and lower the supplemental frame in unison with the furrow-opening devices in moving the parts toward and from working position, and serving to hold the supplemental frame stationary relatively to the main frame while the rock-shaft acts to adjust the furrow-opening devices in working position, substantially as described.

15. In a planter, a main frame provided with supporting-wheels and a rotating axle, furrow-opening and covering devices, means for independently adjusting said furrow-opening devices and covering devices when in working position, and for simultaneously raising both sets of devices out of working position, a seed-dropping mechanism mounted on the main frame and comprising a shaft driven from the axle, and means for automatically interrupting the driving connection between said axle and shaft when the furrow-opening and covering devices are so raised, substantially as described.

16. In a planter, a frame provided with furrow-opening devices, seed-dropping mechanism and covering devices, said frame being provided with axle bearings about midway of its length and other axle bearings near its forward end, supporting-wheels and a removable axle adapted to fit either of said bearings, a tongue, means for connecting said tongue to said frame either rigidly or pivotally at will, a driver's seat mounted on said frame, a press-wheel, and means for detachably connecting said press-wheel to the rear of said frame, substantially as described.

In testimony whereof I affix my signature in presence of two witnesses.

THOMAS J. DUDLEY.

Witnesses:
A. G. TAGGART,
W. C. MINGUS.